May 21, 1963
S. U. GATEWOOD ETAL
3,090,475
CLUTCHES
Filed May 19, 1960
2 Sheets-Sheet 1
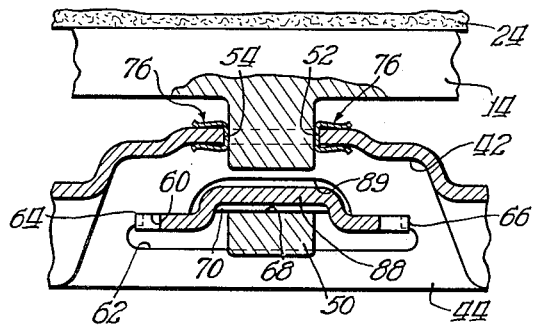
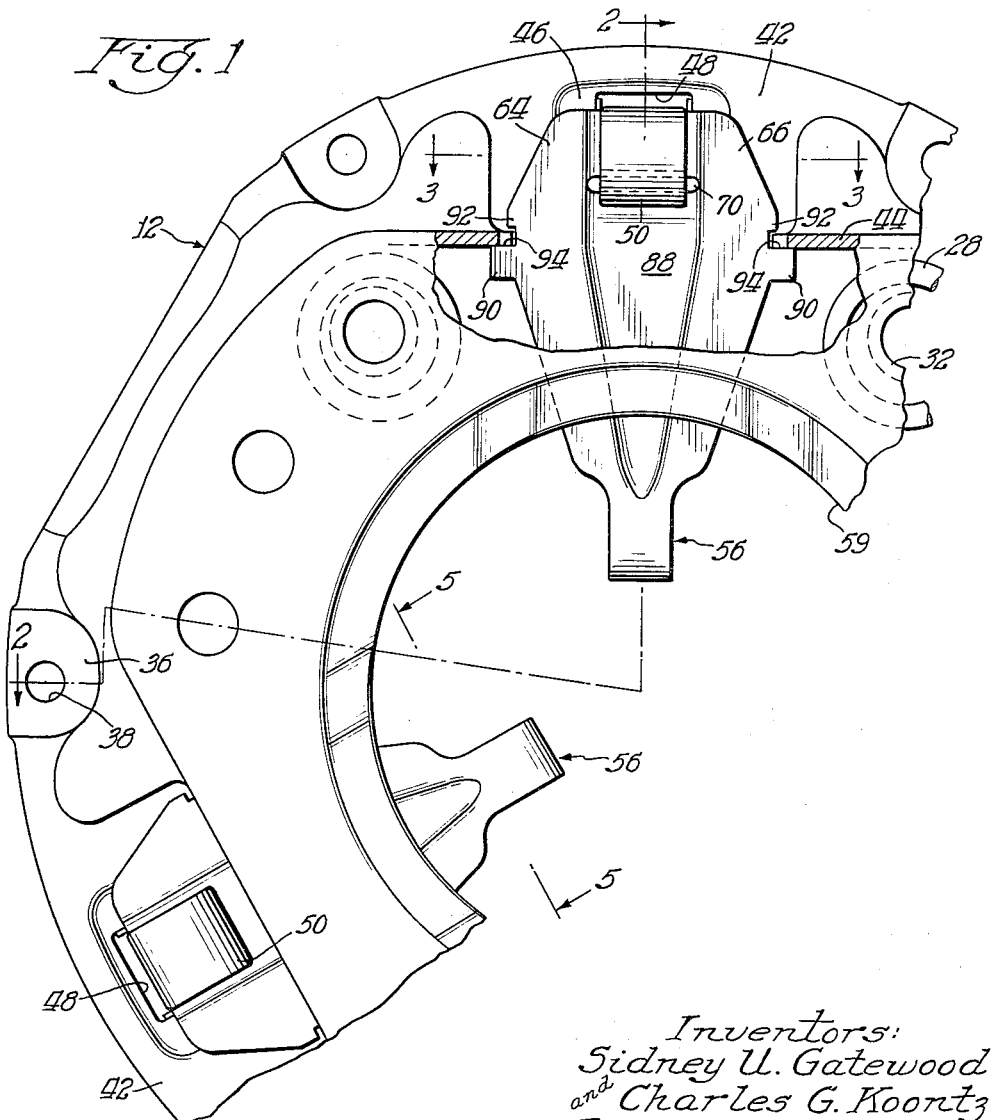
Inventors:
Sidney U. Gatewood
and Charles G. Koontz

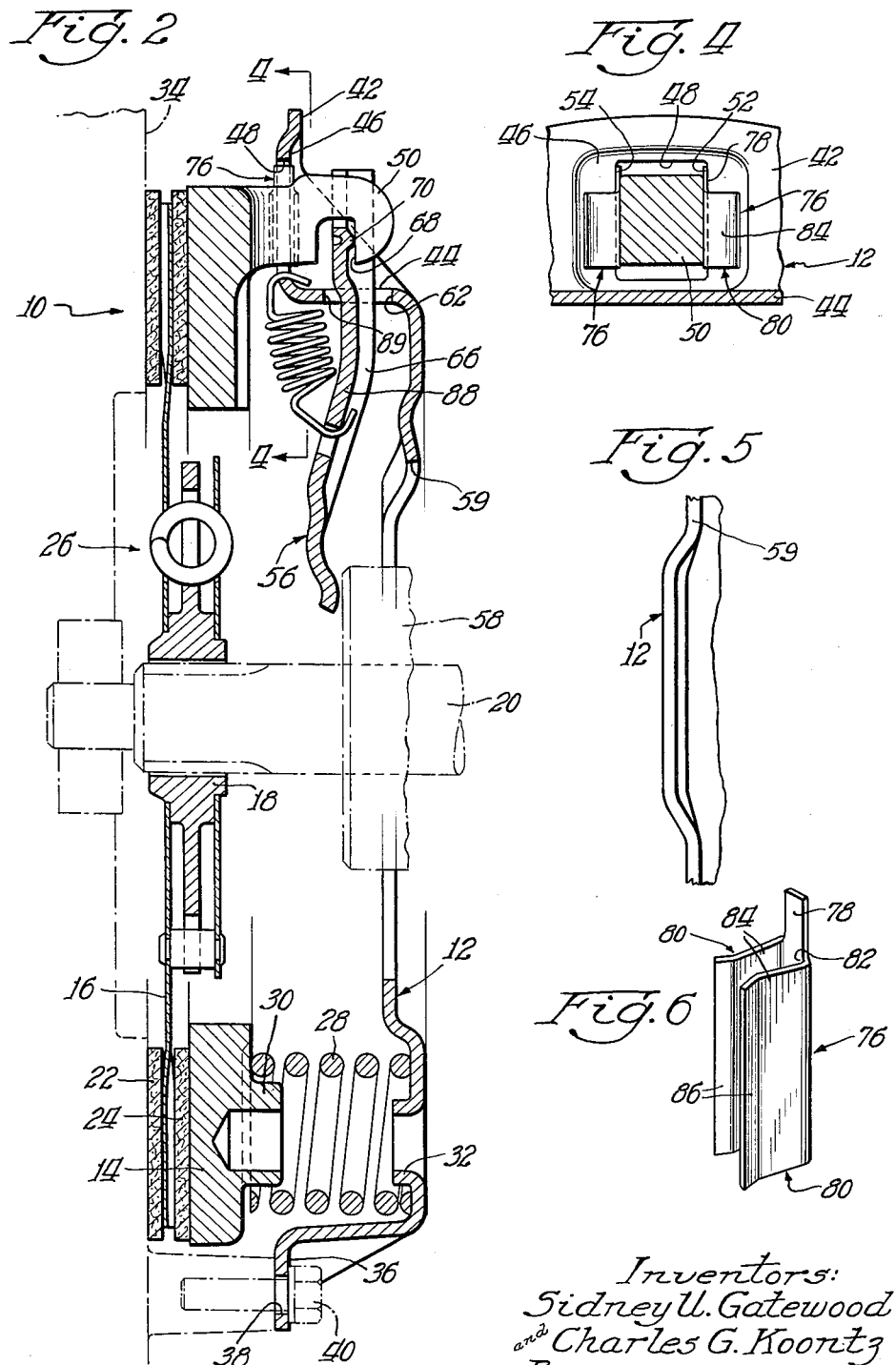

3,090,475
CLUTCHES
Sidney U. Gatewood, Roseville, and Charles G. Koontz, Detroit, Mich., assignors to Borg-Warner Corporation, Chicago, Ill., a corporation of Illinois
Filed May 19, 1960, Ser. No. 30,278
6 Claims. (Cl. 192—99)

This invention relates to clutches, and more particularly, to clutches of the type utilized for drivingly connecting an automotive vehicle engine to the drive line.

Heretofore, automotive vehicle clutches have been devised which comprise a generally concave cover plate secured at its outer marginal edge to the vehicle engine flywheel, a pressure plate biased towards the flywheel by a plurality of coil springs arranged between the cover plate and the pressure plate, a driven plate engageable by the pressure plate and the flywheel, drive being imparted to the pressure plate by a plurality of circumferentially spaced lugs projecting through registering openings in the cover plate and in which release of the pressure plate from the driven plate is afforded by a plurality of circumferentially spaced radially arranged release levers. Each of the release levers customarily pass through a wall of a recess in the cover plate which is substantially perpendicular to the plane of the pressure plate. The levers fulcrum on an edge defining the opening in the recessed wall and one end of the lever positively engage one of the pressure plate lugs so that upon engagement of the inner ends of the levers by a release bearing or the like, the clutch is disengaged. One disadvantage of prior art constructions is that the release levers are formed with a longitudinally extending structural rib and this rib extends in a direction away from the pressure plate with the result that greater axial length of the cover plate, and consequently, of the entire clutch, is required. Another disadvantage of prior art constructions is that the lugs inadvertently engage the edges defining the openings in the cover plate through which they pass with the result that a squeaking noise is produced. This difficulty is compounded, of course, by the fact that the pressure plate customarily is piloted only by the drive lugs.

A primary object of the invention is, therefore, to provide a clutch of the stated type in which an improved cover plate of reduced axial length is afforded which is formed with a plurality of novel openings for reception of improved release levers, each of which has a longitudinal structural rib extending towards the pressure plate so that under centrifugal force conditions the levers are urged away from the release bearing.

A further object of the invention is to provide a clutch device of the character described in which means are povided for preventing squeaking as the pressure plate lugs pass through the registering openings in the cover plate.

A further object of the invention is to provide a clutch mechanism which is characterized by convenience in form and improved functional characteristics.

Other objects and features of the invention will be readily apparent to those skilled in the art from the specification and appended drawings illustrating certain preferred embodiments in which:

FIGURE 1 is a fragmentary elevational view of a clutch made in accordance with the present invention;

FIGURE 2 is a vertical sectional view taken on substantially line 2—2 of FIGURE 1;

FIGURE 3 is an elevational sectional view taken substantially on line 3—3 of FIGURE 1;

FIGURE 4 is a view partly in section taken substantially on line 4—4 of FIGURE 2;

FIGURE 5 is a view taken substantially on line 5—5 of FIGURE 1 and;

FIGURE 6 is a view in perspective of a noise suppressing insert forming a part of the present invention.

Referring now to the drawings and more particularly to FIGURES 1 and 2 the clutch of the present invention is indicated generally by reference numeral 10 and includes a cover plate 12, a pressure plate 14 and a driven plate 16. The driven plate 16 has an internally splined hub 18 illustrated as being secured to an output shaft 20 which is shown in dot and dash lines. At the outer marginal edges of each side of the plate 16 are friction facings 22 and 24. A vibration dampener assembly 26, of conventional type, is interposed between plate 16 and the hub 18 for dampening engine vibrations. The pressure plate 14 is biased into engagement with the driven plate 16 by means of a plurality of coil springs 28 each of which is arranged in operative position by means of an integrally formed pressure plate boss 30 and a boss 32 on the inner surface of the cover plate 12. It will be apparent that the pressure plate 14 engages the friction facing 24 and urges the friction facing 22 into engagement with a radial face of an engine flywheel 34 which is shown in dot and dash lines.

The cover plate 12 is formed at its outer periphery with a plurality of circumferentially spaced flats 36 each of which is formed with an opening 38 for insertion of a cap screw 40 by means of which the cover plate 12 is secured to the flywheel 34. Arranged between the flats 36 are recesses 42 each of which is deeply drawn so as to form a wall 44 which is substantially perpendicular to the plane of the pressure plate 14 and a wall 46, substantially coplanar with the flats 36, each of which is formed with an opening 48 through which extends one of a plurality of circumferentially spaced lugs 50 integrally formed with the pressure plate 14. It will be apparent that drive is imparted to the pressure plate 14 by engagement of the lugs 50 by one of edges 52 or 54 defining the opening 48.

The clutch 10 may be disengaged by moving the pressure plate 14 to the right, as viewed in FIGURE 2, to free the driven plate 16. This is accomplished by a plurality of circumferentially spaced radially extending release levers 56 the inner ends of which are engaged by a release bearing 58 as shown in dot and dash lines, which passes through a central opening 59 in the cover plate 12 for pivotal movement about a fulcrum formed along edges 60 of an opening 62 in each of the walls 44 of each recess 42. The outer end of each release lever 56 is bifurcated to form arms 64 and 66 one passing on each side of a lug 50 which is formed at its inner periphery with a recess 68 for reception of a portion of the body section of the lever radially inwardly of the opening between the arms 64 and 66. This body portion is formed with a transversely extending rib 70 which abuts against one wall of the recess 68 in a manner illustrated clearly in FIGURE 2.

It will be apparent that as drive is imparted to the pressure plate 14 by either the edge 52 or the edge 54 of each opening 48 and engagement or disengagement of the clutch occurs simultaneously the sides of the lug 50 will tend to snub against the edges 52 and 54 with the result that a squeaking noise would be produced. According to the present invention, this difficulty is obviated by means of inserts 76 of soft metal such as brass or the like which cover these edges and resist squeaking. Each of the inserts 76 has a body section 78 which is arranged between the sides of each lug 50 and the edges 52 and 54 and a pair of substantially perpendicular flanges 80 which are formed to embrace the marginal areas of the cover plate defining the edges 52 and 54. Each of the flanges 80 is bent about a radius 82 which is of sufficiently great extent to prevent breaking at this point. The flanges are overbent so that there is formed a first section 84 extending inwardly beyond the edges of the body section 78 and a second section 86 extending outwardly beyond the edges defining the body section 78. By this arrangement, the inserts 76 may be easily clamped in the position illustrated.

According to another important feature of the present invention each of the levers 56 is formed with a longitudinal structural rib 88 which extends towards the pressure plate 14. This rib 88 is received in a recess 89 forming a part of each opening 62. By this arrangement, the axial extent of the wall 44 is minimized with the result that the axial length of the entire clutch is reduced. As seen best in FIGURE 1, each release lever 56 is maintained in position by a pair of outwardly extending tangs 90 which abut against the inner surface of the wall 44 to prevent outward movement of the levers beyond the point illustrated in FIGURE 2. Inward movement of the levers is precluded by shoulders 92 defined by notches 94 which are sufficiently wide to permit pivotal movement of the levers in the manner mentioned.

The clutch of the present invention exhibits important advantages over clutches of prior constructions. For instance, the arrangement of the rib 88 of each lever 56 and the cover plate recess 89 affords a cover plate of minimal axial length. In addition, the inserts 76 permit free axial movement of the pressure plate 14 with respect to the cover plate 12 without disturbing squeaking noises.

While this invention is described in connection with certain specific constructions and arrangements it is to be understood that this is by way of illustration and not by way of limitation and the scope of this invention is defined solely by the appended claims which should be construed as broadly as the prior art will permit.

We claim:

1. In a clutch having a pressure plate, a cover plate adapted to be secured to an engine flywheel, a plurality of circumferentially spaced lugs formed on said pressure plate and extending axially with respect to the axis of rotation of said flywheel, a driven plate adapted to be arranged between said pressure plate and said flywheel, a plurality of circumferentially spaced coil springs extending between said cover plate and said pressure plate for biasing said pressure plate into driving engagement with said driven plate, said cover plate having a plurality of circumferentially spaced recesses, each of said recesses having a first wall in substantial parallelism with said pressure plate and a second wall substantially perpendicular thereto, the first wall of each recess having an opening for reception of one of said lugs, a plurality of circumferentially spaced release levers, each of said lugs having a groove for reception of the radially outer end of one of said levers, said second wall of each recess having an opening defined in part by an edge forming a fulcrum for one of said levers so that movement of the inner ends of said levers towards said pressure plate disengages said driven plate, a metal clip including a body portion having generally perpendicular side flange portions extending from said body portion, whereby said flange portions are adapted to engage said cover plate arranged between the side edges of the opening in said first wall of each recess and the associated lug for preventing noise incident to relative movement therebetween.

2. In a clutch having a pressure plate, a cover plate adapted to be secured to an engine flywheel, a plurality of circumferentially spaced lugs formed on said pressure plate and extending axially with respect to the axis of rotation of said flywheel, a driven plate adapted to be arranged between said pressure plate and said flywheel, a plurality of circumferentially spaced coil springs extending between said cover plate and said pressure plate for biasing said pressure plate into driving engagement with said driven plate, said cover plate having a plurality of circumferentially spaced recesses, each of said recesses having a first wall in substantial parallelism with said pressure plate and a second wall substantially perpendicular thereto, the first wall of each recess having an opening for reception of one of said lugs, a plurality of circumferentially spaced release levers, each of said lugs having a groove for reception of the radially outer end of one of said levers, said second wall of each recess having an opening defined in part by an edge forming a fulcrum for one of said levers so that movement of the inner ends of said levers towards said pressure plate disengages said driven plate and a pair of inserts of relatively soft metal or the like surrounding the side edges of the opening in said first wall of each recess and extending on opposite sides of said cover plate a distance sufficient to maintain said inserts fixed with respect to said cover plate for suppressing noise.

3. In a clutch having a pressure plate, a cover plate adapted to be secured to an engine flywheel, a plurality of circumferentially spaced lugs formed on said pressure plate and extending axially with respect to the axis of rotation of said flywheel, a driven plate adapted to be arranged between said pressure plate and said flywheel, a plurality of circumferentially spaced coil springs extending between said cover plate and said pressure plate for biasing said pressure plate into driving engagement with said driven plate, said cover plate having a plurality of circumferentially spaced recesses, each of said recesses having a first wall in substantial parallelism with said pressure plate and a second wall substantially perpendicular thereto, the first wall of each recess having an opening for reception of one of said lugs, a plurality of circumferentially spaced release levers, each of said lugs having a groove for reception of the radially outer end of one of said levers, said second wall of each recess having an opening defined in part by an edge forming a fulcrum for one of said levers so that movement of the inner ends of said levers towards said pressure plate disengages said driven plate, and a pair of inserts of relatively soft metal or the like surrounding the side edges of the opening in said first wall of each recess for suppressing noise, each of said inserts including a body portion lying in engagement with one of said edges and a pair of flanges forming a clamp engaging the marginal edges of said first wall surrounding said edges.

4. In a clutch having a pressure plate, a cover plate adapted to be secured to an engine flywheel, a plurality of circumferentially spaced lugs formed on said pressure plate and extending axially with respect to the axis of rotation of said flywheel, a driven plate adapted to be arranged between said pressure plate and said flywheel, a plurality of circumferentially spaced coil springs extending between said cover plate and said pressure plate for biasing said pressure plate into driving engagement with said driven plate, said cover plate having a plurality of circumferentially spaced recesses, each of said recesses having a first wall in substantial parallelism with said pressure plate and a second wall substantially perpendicular thereto, the first wall of each recess having an opening for reception of one of said lugs, a plurality of circumferentially spaced release levers, each of said levers having a longitudinally extending structural rib extending towards said pressure plate, each of said lugs having a groove for reception of the radially outer end of one of said levers, said second wall of each recess having an opening defined in part by opposed side portions including a fulcrum point and an inner edge for reception of the associated structural rib, each of said levers having opposed side portions having side portions including outwardly extending tangs and shoulders together defining a notch sufficiently wide to engage said opposed side portions to enable said lever to pivot about said fulcrum point.

5. In a clutch having a pressure plate, a cover plate adapted to be secured to an engine flywheel, a plurality of circumferentially spaced lugs formed on said pressure plate and extending axially with respect to the axis of rotation of said flywheel, a driven plate adapted to be arranged between said pressure plate and said flywheel, a plurality of circumferentially spaced coil springs extending between said cover plate and said pressure plate for biasing said pressure plate into driving engagement with said driven plate, said cover plate having a plurality of circumferentially spaced recesses, each of said recesses having a first wall in substantial parallelism with said pressure plate and a second wall substantially perpendicular thereto, the first wall of each recess having an opening for reception of one of said lugs, a plurality of circumferentially spaced release levers, each of said levers having a longitudinally extending structural rib extending towards said pressure plate, each of said lugs having a groove for reception of the radially outer end of one of said levers, said second wall of each recess having an opening defined in part by opposed side portions including a fulcrum point and an inner edge for reception of the associated structural rib, each of said levers having opposed side portions having side portions including outwardly extending tangs and shoulders together defining a notch sufficiently wide to engage said opposed side portions to enable said lever to pivot about said fulcrum point, and a pair of inserts of relatively soft metal or the like surrounding the side edges of the opening in said first wall of each recess for suppressing noise.

6. In a clutch having a pressure plate, a cover plate adapted to be secured to an engine flywheel, a plurality of circumferentially spaced lugs formed on said pressure plate and extending axially with respect to the axis of rotation of said flywheel, a driven plate adapted to be arranged between said pressure plate and said flywheel, a plurality of circumferentially spaced coil springs extending between said cover plate and said pressure plate for biasing said pressure plate into driving engagement with said driven plate, said cover plate having a plurality of circumferentially spaced recesses, each of said recesses having a first wall in substantial parallelism with said pressure plate and a second wall substantially perpendicular thereto, the first wall of each recess having an opening for reception of one of said lugs, a plurality of circumferentially spaced release levers, each of said levers having a longitudinally extending structural rib extending towards said pressure plate, each of said lugs having a groove for reception of the radially outer end of one of said levers, said second wall of each recess having an opening defined in part by an edge forming a fulcrum for one of said levers so that movement of the inner ends of said levers towards said pressure plate disengages said driven plate, said edge being interrupted by a recess for reception of the structural rib of the associated lever, a pair of inserts of relatively soft metal or the like surrounding the side edges of the opening in said first wall of each recess for suppressing noise, each of said inserts including a body portion lying in engagement with one of said edges and a pair of flanges forming a clamp engaging the marginal edges of said first wall surrounding said edges.

References Cited in the file of this patent

UNITED STATES PATENTS

| | | |
|---|---|---|
| 2,194,040 | Wemp | Mar. 19, 1940 |
| 2,405,357 | Jarrett | Aug. 6, 1946 |
| 2,720,958 | Lysett | Oct. 18, 1955 |
| 2,751,272 | Hutzelman | June 19, 1956 |
| 2,895,581 | Lysett | July 21, 1959 |
| 2,920,731 | Zeidler | Jan. 12, 1960 |